Patented Feb. 15, 1938

2,108,250

UNITED STATES PATENT OFFICE 2,108,250

HYDROGENATED HEAVY OIL

William H. Carmody, Pittsburgh, Pa., assignor to The Neville Company, a corporation of Pennsylvania No Drawing. Application November 28, 1936, Serial No. 113,260

4 Claims. (Cl. 260—7)

This invention relates to the treatment of phenolic heavy oil.

In the production of phenol-modified resins of the coumarone type, by conducting in a mixture of crude solvent naphtha and phenolic reagent simultaneous polymerization reaction and reaction involving the phenolic substance, the resultant phenol-modified coumarone resin has in its content phenol-modified polymers in different stages of polymerization. By suitable procedure, such as steam distillation, subsequent to the resin-forming reactions, the resinous products are separated into a solid, alcohol-soluble resin and a soft fluid substance consisting of polymerized and phenol-modified products of indene, coumarone, dicyclopentadiene, or the like, which heavy oil is when gently heated a solvent for cellulose acetate.

The undesirable qualities of this phenolic heavy oil are a relatively dark color and an unpleasant odor. I have greatly improved the color and odor of the phenolic heavy oil by hydrogenation.

In initially attempting, by hydrogenation, to improve the color and odor of the phenolic heavy oil, I subjected it to hydrogenation under conditions suitable for hydrogenation of a "coumarone" heavy oil without phenolic modification. That is, I introduced the heavy oil, together with a solvent and a substantial quantity of Raney nickel catalyst, into a pressure bomb arranged for agitation of its contents. Under heat, and with agitation, hydrogen was introduced under such pressure and for such time period as to effect hydrogenation of the heavy oil to a substantial degree. A typical procedure of this sort may be given as follows:

Heavy oil_____ 100 grams  
Nickel catalyst __ 100 grams  } charged into hydrogenator  
Cyclohexane_____ 200 cc.

Conditions:
 Total time: 2¼ hours.
 Maximum H₂ pressure: 1080# at beginning.
 Maximum temperature: 198° C. at end.

In operation, the hydrogen was admitted to 1080# and heat applied. At very moderate temperatures the pressure dropped to 320# at 170° C. The bomb was recharged to 1080# and the pressure dropped to 470# at 192° C. The third charge to 1080# proved to be sufficient with the pressure failing to drop below 630# at 195° C. when held there for approximately 30 minutes.

The product obtained by this procedure was a clear, colorless heavy oil free from its original phenolic odor. It had a faint alcoholic odor, resembling cyclohexanol and related compounds. This strongly hydrogenated heavy oil is not, however, a solvent for cellulose acetate. Apparently the severity of the treatment resulted in aromatic ring and double bond saturation, with the formation of an alcohol group instead of a phenolic group.

Upon further investigation, I have discovered that I can, by hydrogenation, very substantially improve the color and odor of the phenolic heavy oil without detriment to its solvency for cellulose acetate. This I do by hydrogenating the heavy oil to an extent equal to but a small proportion of the theoretically possible. To effect this purpose, I operated with a decreased quantity of catalyst, and under decreased severity in the conditions of temperature and pressure. A typical example of my satisfactory conditions may be given as follows:

Example No. 1

Heavy oil_____ 460 grams  
Nickel catalyst__ 48 grams  } charged into hydrogenator  
No solvent

Operating conditions

One hundred pounds of hydrogen were charged into the hydrogenator at normal room temperature, and the hydrogenator was gently heated. At a temperature of 60° C. absorption was rapid, and entire absorption occurred at a temperature of 85° C. Upon cooling to normal room temperature there was a zero pressure in the hydrogenator. The heavy oil showed improvement in both its color and odor, but both were still noticeable and of typical sort.

I then repeated the dosage of hydrogen two additional times, in each step limiting the pressure to a maximum of 100 pounds and limiting the temperature to a maximum of 92° C. The total time of actual hydrogenating treatment was approximately three hours, one hour being allotted to each dosage of hydrogen.

Results

The result of this step-by-step, and rigidly controlled, hydrogen modification was to produce a clear and very light colored phenolic heavy oil of greatly reduced odor.

The heavy oil did not suffer impairment in its capacity to dissolve cellulose acetate.

Comparing the weight of hydrogen introduced into the heavy oil by this above-described procecure with the weight of the unmodified heavy oil, I found that I had introduced hydrogen in a quantity equal to about 3% the quantity in which it might theoretically be introduced. The problem was then to find how far hydrogenation might be carried without impairing the solvency of the heavy oil for cellulose acetate. The following example approximates optimum conditions.

Example No. 2

| | | |
|---|---|---|
| Heavy oil | 460 grams | charged into hydrogenator |
| Nickel catalyst | 48 grams | |
| No solvent | | |

Procedure

Similarly to procedure in Example 1, the hydrogen was supplied in 100 pound dosages, the pressure never exceeding a maximum of 100 pounds. The temperature at no time exceeded 100° C.

Instead of employing 3 successive dosages of hydrogen of 100 pounds each, 6 dosages in the same quantity were employed, the pressure being permitted to fall to zero after each injection of hydrogen.

Results

The phenolic heavy oil as so hydrogen-modified had an almost imperceptible coloration, and its odor was only faintly reminiscent of phenol.

The heavy oil did not suffer impairment in its capacity to dissolve cellulose acetate.

It will be observed, the quantity of heavy oil treated being identical with the quantity treated in Example No. 1, that the quantity of hydrogen introduced into the heavy oil is doubled. The actual hydrogenation effected was thus about 6% the theoretically possible.

Having thus successfully modified the phenolic heavy oil, I experimented to see how far hydrogenation might be carried without detracting from the most valuable quality of the heavy oil. By a series of experiments I discovered that loss of solvency for heavy oil was suffered to a perceptible degree when the phenolic heavy oil had been hydrogen-modified to an extent equal to 10% of the theoretically possible. When introduced in quantities exceeding 10% of the theoretical, hydrogen served increasingly to impair the solvent power of the phenolic heavy oil for cellulose acetate. The conclusion was that hydrogenation of the phenolic heavy oil should not be continued to a point greatly exceeding 10% the theoretically possible, and that the best results are attained when hydrogenating to an extent equal to from 4% to 9% of complete theoretical hydrogenation.

It should be explained that, in preparation for each hydrogenation, the hydrogenator is flushed free of air by hydrogen, so that a completely hydrogen atmosphere exists within the hydrogenator during actual hydrogenation. Also it should be understood that the step-by-step procedure given in the examples was employed chiefly as a convenience in feeling my way, after deciding that a substantially less than complete hydrogenation might cause substantial improvement in the phenolic heavy oil, without in practical effect lessening its utility. Thus, if the quantity of heavy oil subjected to hydrogen modification be relatively small, all the hydrogen may be introduced at one charge. If, however, the heavy oil is treated in relatively large batches, resort is again desirably had to a step-by-step procedure, in order that the employment of excessive pressure may be avoided. Generally, it may be stated that any mode of hydrogen introduction is satisfactory, provided that it is compatible with reasonably accurate measurement of the quantity of hydrogen which is introduced.

The utility of my invention is great, for the reason that cellulose acetate is a material finding increased use in the arts. The phenolic heavy oil, as such, is a good solvent for the cellulose acetate, but is, when unmodified, an undesirable solvent for cellulose acetate in preparing cellulose acetate for many of its uses. By freeing the phenolic heavy oil of its objectionable qualities, while retaining to the full its most valuable property, I have succeeded in obtaining a product of substantial commercial and technical value.

I claim as my invention:

1. As a composition of matter a heavy oil consisting primarily of the soft fluid steam-volatile product of those polymerizables found in crude solvent naphtha resulting from polymerization and reaction of those polymerizables with a phenolic substance in a mixture of crude solvent naphtha and a phenolic reactive and modified further by hydrogenation up to a point at which hydrogen modification serves to render the phenolic heavy oil approximately colorless and odorless and below a point at which the phenolic heavy oil loses its inherent capacity to dissolve cellulose acetate.

2. As a composition of matter a heavy oil consisting primarily of the soft fluid steam-volatile product of those polymerizables found in crude solvent naphtha resulting from polymerization and reaction of those polymerizables with a phenolic substance in a mixture of crude solvent naphtha and a phenolic reactive, said phenol-modified heavy oil being when heated a solvent for cellulose acetate, and said heavy oil being approximately colorless and odorless by virtue of hydrogenation not greatly in excess of 10% the theoretically possible hydrogenation of the heavy oil.

3. As a composition of matter a heavy oil consisting primarily of the soft fluid steam-volatile product of those polymerizables found in crude solvent naphtha resulting from polymerization and reaction of those polymerizables with a phenolic substance in a mixture of crude solvent naphtha and a phenolic reactive, said phenol-modified heavy oil being when heated a solvent for cellulose acetate, and said phenol-modified heavy oil being approximately colorless and odorless by virtue of hydrogenation within the approximate range of 4% the theoretically possible hydrogenation of the heavy oil and 9% the theoretically possible hydrogenation of the heavy oil.

4. As a composition of matter a heavy oil consisting primarily of the soft fluid steam-volatile product of those polymerizables found in crude solvent naphtha resulting from polymerization and reaction of those polymerizables with a phenolic substance in a mixture of crude solvent naphtha and a phenolic reactive, said phenol-modified heavy oil being when heated a solvent for cellulose acetate, and said phenolic heavy oil having a color depth and odor substantially reduced by partial hydrogenation within a range below about 10% the theoretically possible hydrogenation of the phenolic heavy oil.

WILLIAM H. CARMODY.